United States Patent
Kudo et al.

(10) Patent No.: US 7,368,702 B2
(45) Date of Patent: May 6, 2008

(54) MULTI-OPTICAL-PATH PHOTOELECTRIC SAFETY APPARATUS

(75) Inventors: Motohiro Kudo, Osaka (JP); Tetsu Inoue, Osaka (JP)

(73) Assignee: Keyence Corporation, Osaka-shi (JP)

( * ) Notice: Subject to any disclaimer, the term of this patent is extended or adjusted under 35 U.S.C. 154(b) by 3 days.

(21) Appl. No.: 10/335,844

(22) Filed: Jan. 3, 2003

(65) Prior Publication Data

US 2003/0164447 A1   Sep. 4, 2003

(30) Foreign Application Priority Data

Mar. 4, 2002   (JP) ................. P. 2002-057378

(51) Int. Cl.
*G01V 8/10* (2006.01)
(52) U.S. Cl. ................. 250/221; 250/222.1; 340/555; 340/556; 340/679
(58) Field of Classification Search ......... 250/221, 250/222.1; 340/555–557, 679
See application file for complete search history.

(56) References Cited

U.S. PATENT DOCUMENTS

| | | | |
|---|---|---|---|
| 4,249,074 A * | 2/1981 | Zettler et al. ............ 250/221 |
| 5,243,183 A * | 9/1993 | Barron et al. ............ 250/222.1 |
| 5,302,942 A * | 4/1994 | Blau .................... 340/556 |
| 6,354,716 B1 * | 3/2002 | Chen et al. ............. 362/268 |
| 6,596,983 B2 * | 7/2003 | Brent .................... 250/221 |
| 6,624,751 B2 * | 9/2003 | Haberer et al. ........... 340/555 |
| 6,635,862 B2 * | 10/2003 | Shteynberg et al. ...... 250/221 |
| 6,720,874 B2 * | 4/2004 | Fufido et al. ............. 340/541 |
| 6,774,352 B2 * | 8/2004 | Koyama et al. .......... 250/221 |
| 6,791,074 B2 * | 9/2004 | Hahn et al. .............. 250/221 |
| 2002/0017603 A1 | 2/2002 | Haberer et al. | |

FOREIGN PATENT DOCUMENTS

| | | |
|---|---|---|
| DE | 44 24 537 A | 1/1996 |
| JP | 2-271199 A | 11/1990 |
| JP | 6-132802 A | 5/1994 |
| JP | 9-270688 A | 10/1997 |
| JP | 10-156596 A | 6/1998 |
| JP | 2001-71192 A | 3/2001 |

* cited by examiner

*Primary Examiner*—Davienne Monbleau
(74) *Attorney, Agent, or Firm*—Smtih Patent Office

(57) ABSTRACT

A multi-optical-path photoelectric safety apparatus or a light curtain is placed in front of a pressing machine or a folding machine. Optical paths are set as a floating blanking area B (some paths out of a large number of optical paths) in the light curtain. The operation of the pressing machine or folding machine is forcibly stopped when two contiguous optical paths are blocked in the floating blanking area B. On the other hand, the normal protection function serves in areas A and C between which area B is sandwiched. In these areas A and C, if any one optical path enters a light blocked state, the operation of the pressing machine or folding machine is immediately stopped.

17 Claims, 8 Drawing Sheets

MULTI-OPTICAL-PATH PHOTOELECTRIC SAFETY APPARATUS

BACKGROUND OF THE INVENTION

1. Field of the Invention

The present invention relates to a multi-optical-path photoelectric safety apparatus having a light emitting unit and a light receiving unit. More particularly, the present invention relates to a multi-optical-path photoelectric safety apparatus comprising a floating blanking function.

2. Discussion of the Related Art

A multi-optical-path photoelectric safety apparatus is provided to ensure worker safety when using an apparatus involving a source of danger, such as a pressing machine or a folding machine. The multi-optical-path photoelectric safety apparatus comprises a light emitting unit and a light receiving unit. The light emitting unit comprises a large number of light emitting elements arranged in a row. The light receiving unit comprises a corresponding number of light receiving elements as the number of the light emitting elements, and they are also arranged in a row. The light emitting and receiving units form a protective barrier by making a light curtain. When a light blocking substance through which light cannot transmit enters a detection area of the protective barrier, the operation of a machine, such as a pressing machine, a folding machine, etc., is forcibly stopped.

When using a metalworking machine such as a folding machine, the worker may hold a part of a workpiece while working. In order to deal with the worker holding the workpiece, the multi-optical-path photoelectric safety apparatus comprises a floating blanking function.

The usual protection function of the multi-optical-path photoelectric safety apparatus is to forcibly stop the machine immediately when a light block state occurs regardless of the number of blocked optical paths. However, with the floating blanking function, the machine is not forcibly stopped until two contiguous (or adjacent) optical paths are blocked.

A related art device showing a floating blanking function will be discussed with reference to FIG. 8. In FIG. 8, a multi-optical-path photoelectric safety apparatus comprises a light emitting-receiving unit 1. A worker O stands in a safety area outside the light emitting-receiving unit 1 and from this area, the worker O inserts a workpiece W into a working apparatus 2 containing a source of danger and performs an operation, such as, bending of the workpiece W.

In the case where the workpiece W is simply inserted into the working apparatus 2, the workpiece W only blocks one optical path of a light curtain formed by the light emitting-receiving unit 1. Thus with the floating blanking function, the light emitting-receiving unit does not determine that a human body has entered, and this allows the working machine 2 to operate continuously.

However, if the worker is pulled into the working apparatus 2 along with the workpiece W and two contiguous (adjacent) optical paths become blocked, the operation of the working apparatus 2 is immediately stopped.

The floating blanking function is set for the entire detection area of the light curtain in the related art device.

However, if the floating blanking function serves the entire detection area of the light curtain, the distance between the light curtain and the apparatus protected by the light curtain, namely, the safety distance, needs to be increased and this causes a problem.

For example, if the size of the minimum detection body when the normal protection function operates is 25 mm in diameter, the size of the minimum detection body when the floating blanking function operates becomes 45 mm in diameter. Assuming that the response time of the light curtain and the time until the apparatus protected by the light curtain stops are 35 ms in total, the safety distance based on European Standard EN999 is 158 mm when the normal protection function operates. However, the safety distance becomes 906 mm when the floating blanking function operates.

Thus, for a pressing machine, a workpiece folding machine, etc., where the floating blanking function needs to be used, the machine and the light curtain installed ahead the machine need to be located 158 mm away from each other (the safety distance when using the normal protection function) plus 748 mm. Therefore, the distance x0 between the danger source 2 and the light curtain needs to be 906 mm. This means that the worker must stand working at a distant position away from the pressing machine or the workpiece folding machine.

Accordingly, since the worker must work at a distance away from the working machine, the distance the worker must move the workpiece to insert the workpiece into the working machine is also increased. Thus, this increased distance easily reduces the productivity of the machine.

SUMMARY OF THE INVENTION

It is therefore an object of the invention to provide a multi-optical-path photoelectric safety apparatus comprising a floating blanking function that can reduce the distance a light curtain needs to be installed away from an apparatus to keep it protected by the light curtain.

Accordingly, there is provided a multi-optical-path photoelectric safety apparatus comprising: a light emitting unit; a light receiving unit forming a plurality of optical paths with a light emitting unit so as to provide a light curtain between the light emitting unit and the light receiving unit; and a floating blanking function device having a floating blanking function for stopping operation of an apparatus protected by the light curtain when at least two optical paths forming the light curtain enter a light blocked state, wherein a floating blanking area is set by the floating blanking function device and is an area where the floating blanking function is operated, the floating blanking area being set as a part of a detection area forming the light curtain. A plurality of optical paths, which are adjacent to each other, are typically two contiguous optical paths.

According to the invention, a floating blanking area is set in a part of the detection area of the light curtain formed between the light emitting unit and the light receiving unit. This floating blanking function operates in a limited area of the light curtain and the normal protection function operates in all of the other areas.

Since the safety distance of the area in which the normal protection function serves may be small; the location where the light curtain can be installed can be determined by individually considering the safety distance in relation to a plurality of danger sources existing in the apparatus protected by the light curtain. Thus, the light curtain can be installed closer to the apparatus protected by the light curtain than when the floating blanking function is operated for the entire detection area of the light curtain as in the related art devices.

The condition for stopping the operation of the apparatus protected by the light curtain is the light blocked condition based on the floating blanking function. This condition may set as a floating blanking area that is blocking a plurality of optical paths that are adjacent to each other or it may be set as blocking a plurality of optical paths. The user can set either condition as desired. Of course, the user may also be able to select a plurality of optical paths for the floating blanking function.

These and other objects and advantages of the invention will become more apparent from the detailed description of the preferred embodiments described below.

DETAILED DESCRIPTION OF THE PREFERRED EMBODIMENTS

Figure 1:
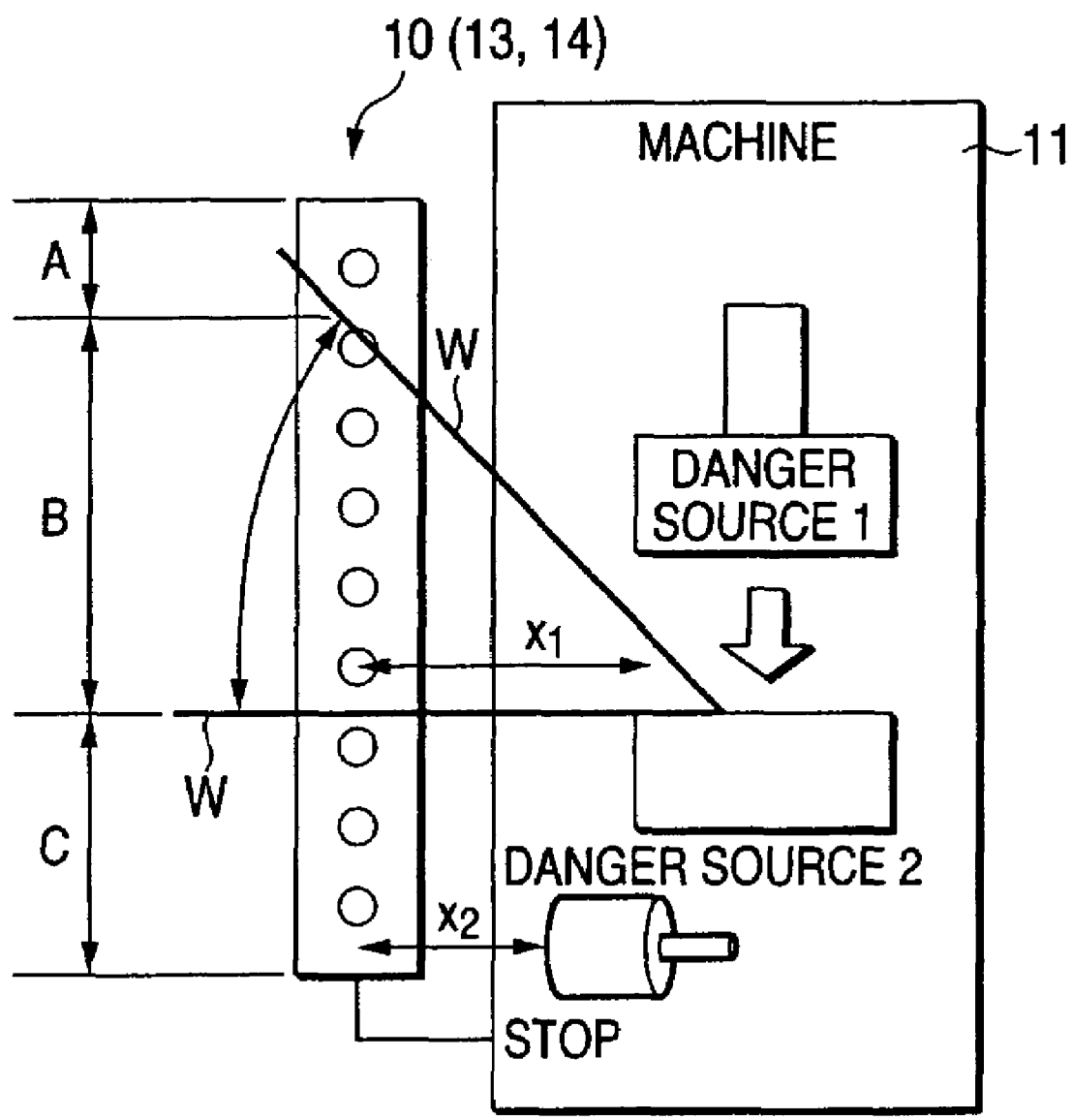
FIG. 1 is a drawing describing a function where a floating blanking area is set in a partial area of a detection area according to an embodiment of the present invention.

A multi-optical-path photoelectric safety apparatus 10 according to a first embodiment includes a light emitting unit 13 and a light receiving unit 14 placed in front of a pressing machine or a folding machine 11 as shown in FIG. 1.

Figure 2:
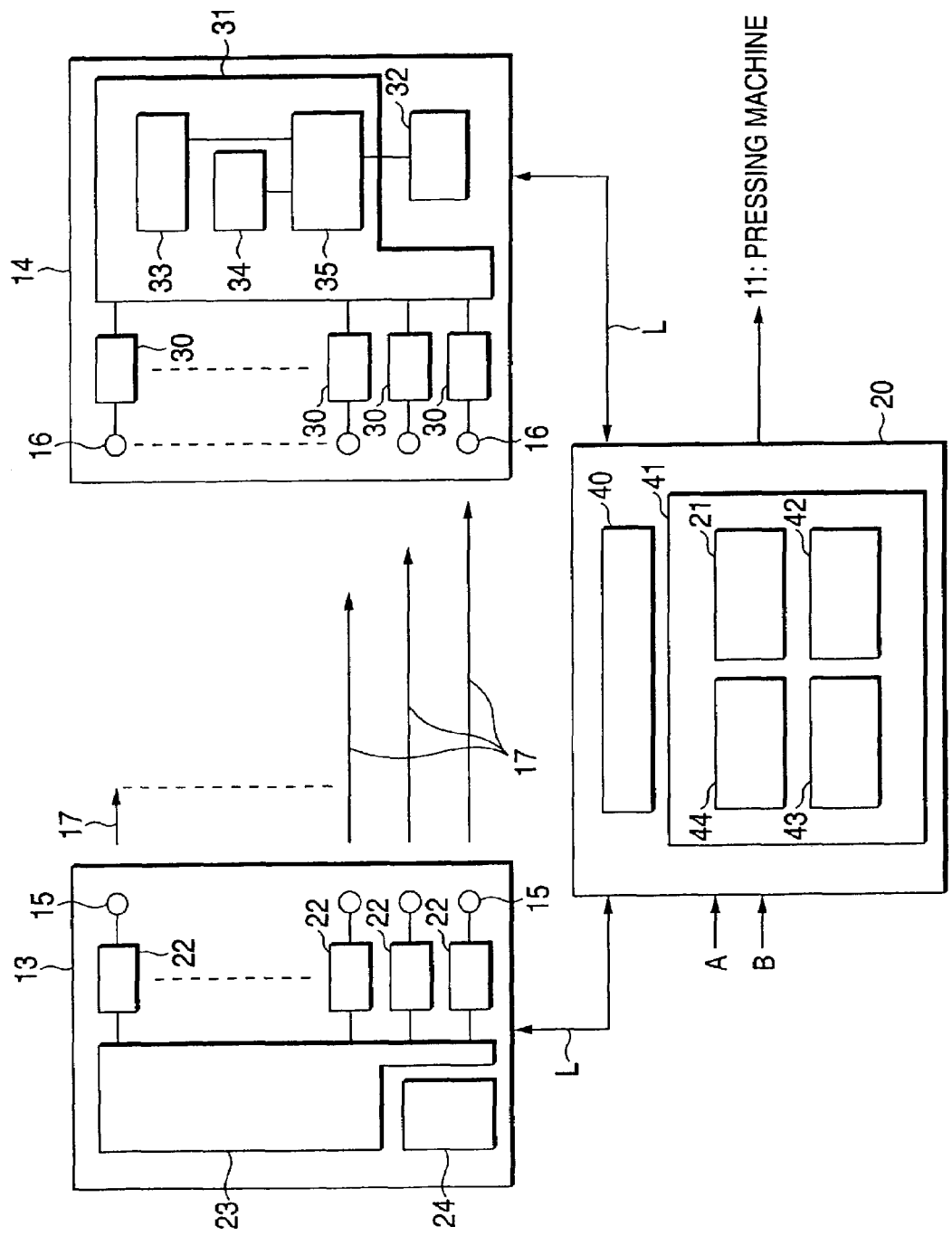
FIG. 2 is a block diagram showing the general configuration of a multi-optical-path photoelectric safety apparatus according to an embodiment of the present invention.
Figure 3:
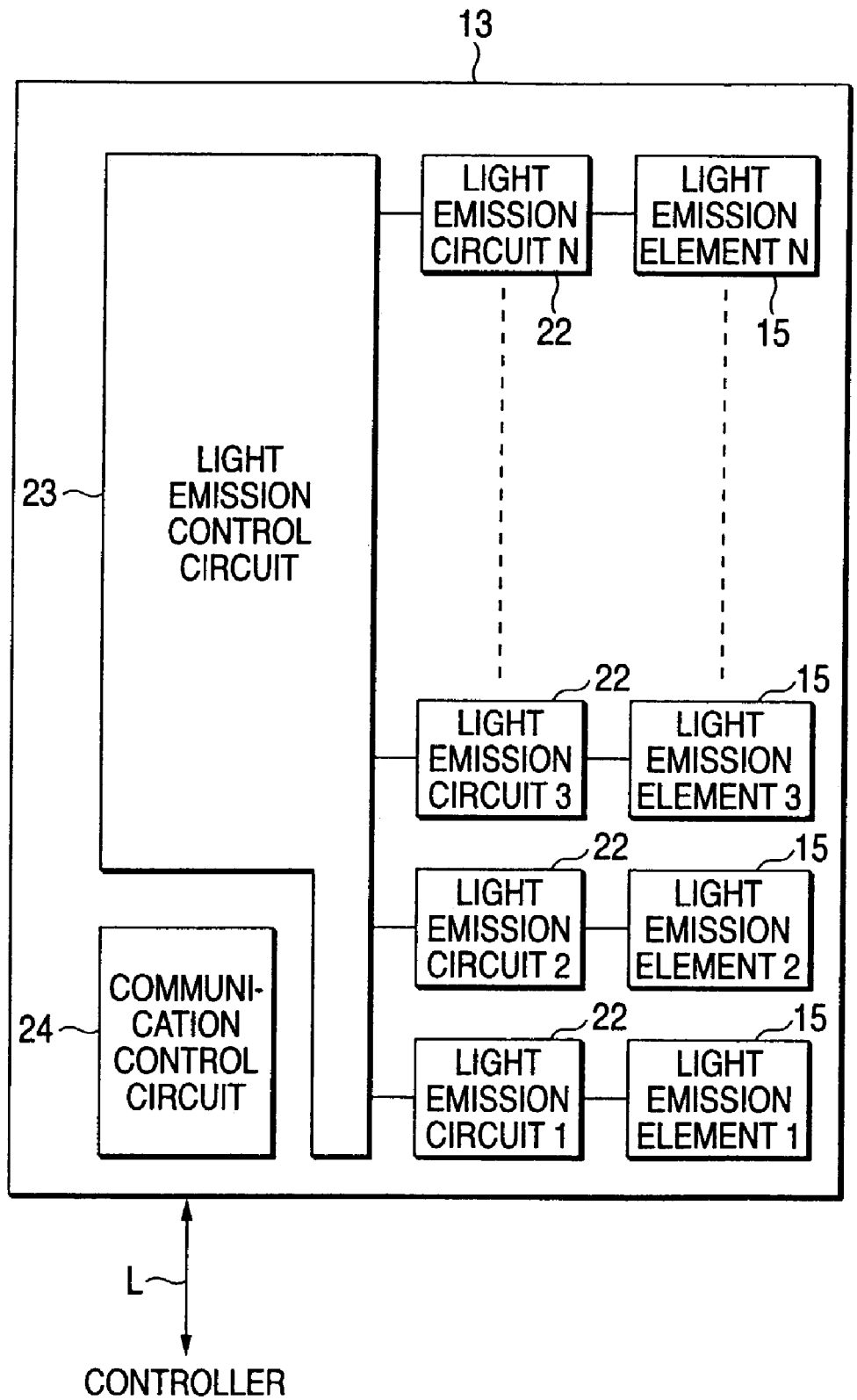
FIG. 3 is an enlarged block diagram of a light emitting unit included in the multi-optical-path photoelectric safety apparatus according to an embodiment of the present invention.

As seen in FIG. 1, the light emitting unit 13 has an elongated case extending in a longitudinal direction and comprises N light emitting elements 15 (that are particularly shown in FIGS. 2 and 3). The light emitting elements 15 are placed in the case at equal intervals in a row along the lengthwise direction of the case. The interval between the adjacent light emitting elements 15 is not specifically limited and can be, for example, 20 mm.

Likewise, the light receiving unit 14 has an elongated case extending in a longitudinal direction and comprises a corresponding number of light receiving elements 16 (FIGS. 2 and 4) as the number of the light emitting elements 15. The light receiving elements 16 are placed in the case at equal intervals in a row along the lengthwise direction of the case. The interval between the adjacent light receiving elements 16 is the same as the interval that is used between the adjacent light emitting elements 15.

A horizontal light beam 17 is emitted from each light emitting element 15 of the light emitting unit 13 to the light receiving element 16 of the light receiving unit 14 corresponding to the light emitting element 15, as shown in FIG. 2. With these horizontal light beams, the light emitting unit 13 and the light receiving unit 14 form a light curtain. This is a protective barrier ahead of the pressing machine or the folding machine 11 (or between the working machine 11 and the worker).

The multi-optical-path photoelectric safety apparatus 10 has a controller 20 as shown in FIG. 2. The controller 20 preferably includes a state display monitor or user interface display section 21.

Figure 4:
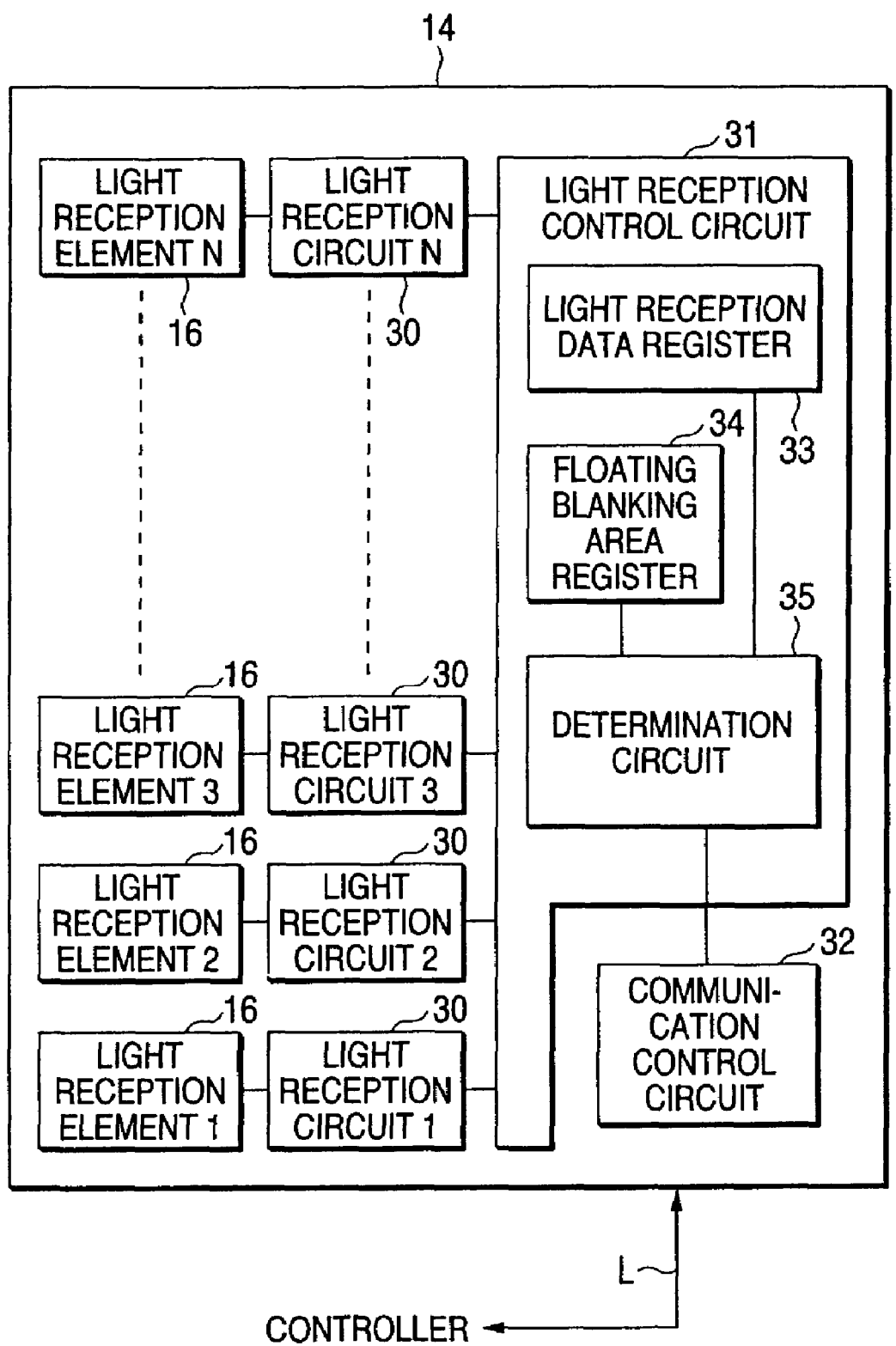
FIG. 4 is an enlarged block diagram of a light receiving unit included in the multi-optical-path photoelectric safety apparatus according to an embodiment of the present invention.
Figure 5:
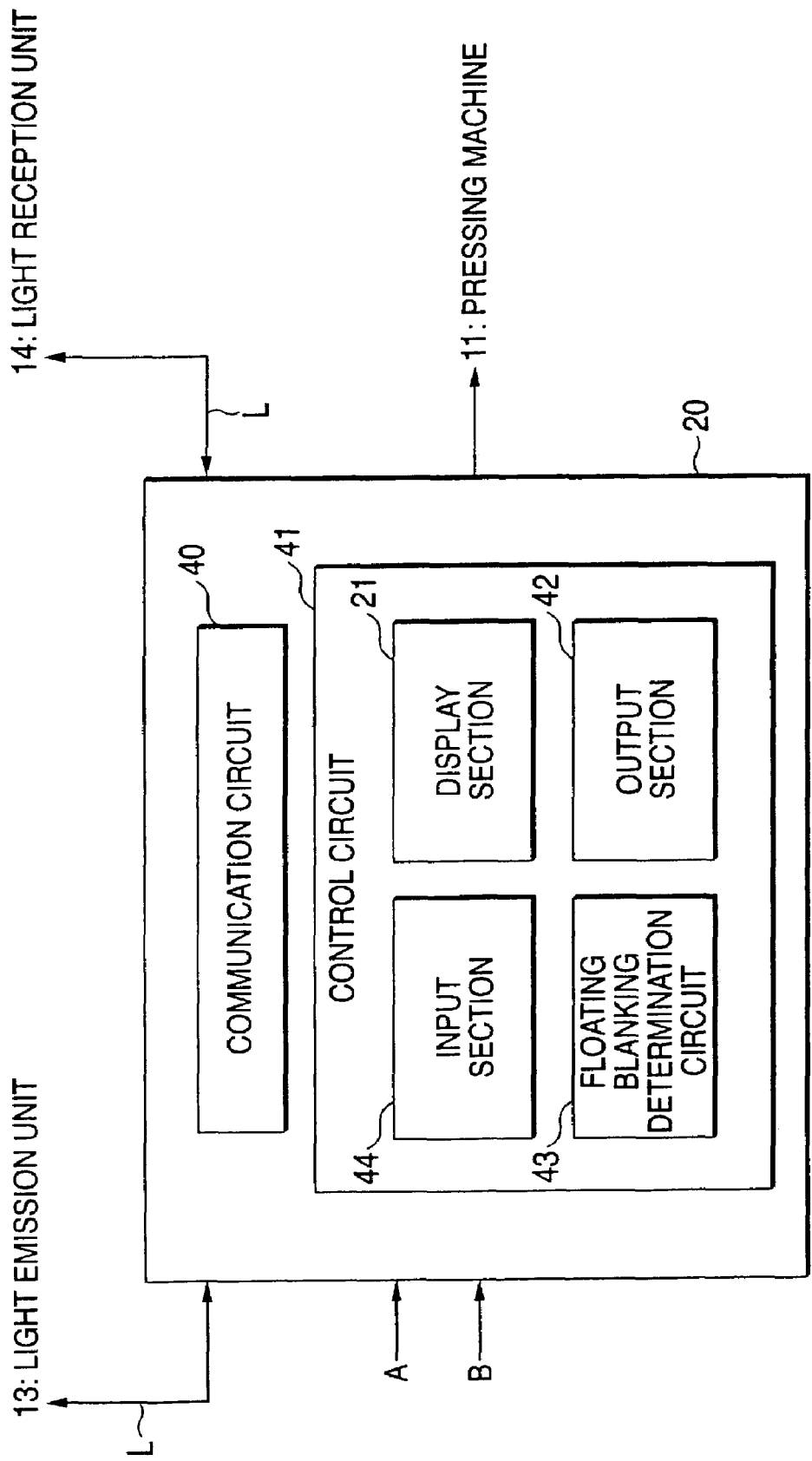
FIG. 5 is an enlarged block diagram of a controller included in the multi-optical-path photoelectric safety apparatus according to an embodiment of the present invention.

FIGS. 2 to 5 are block diagrams relevant to the multi-optical-path photoelectric safety apparatus 10. FIG. 2 is a block diagram to show the general configuration of the multi-optical-path photoelectric safety apparatus 10. FIG. 3 is a block diagram of the light emitting unit 13. FIG. 4 is a block diagram of the light receiving unit 14. Further, FIG. 5 is a block diagram of the controller 20.

Referring particularly to FIG. 3, the light emitting element 13 comprises the N light emitting elements 15, N light emitting circuits 22, a light emitting control circuit 23, and a communication control circuit 24. The light emitting circuits 22 are provided in a one-to-one correspondence with the light emitting elements 15 which can be, for example, light emitting diodes for driving them. The light-emitting control circuit 23 controls the light emitting circuits 22. The communication control circuit 24 controls communications with the controller 20. Upon receiving an instruction from the controller 20, the light emitting control circuit 23 starts the N light emitting circuits 22 in order. This sequentially turns on the light emitting element 15 of the first optical path to the light emitting element 15 of the Nth optical path. Accordingly, the light emitting element 13 emits a light beam in order from the first optical path through the Nth optical path to the light receiving unit 14 at predetermined light emitting timings.

Referring to FIG. 4, the light receiving element 14 comprises the N light receiving elements 16, N light receiving circuits 30, a light receiving control circuit 31, and a communication control circuit 32. The light receiving circuits 30 are provided in a one-to-one correspondence with the light receiving elements 16. The light receiving control circuit 31 controls the light receiving circuits 30. The communication control circuit 32 controls communications with the controller 20. Upon receiving a control signal from the controller 20, the light receiving control circuit 31 makes the light receiving circuit 30 of the first optical path to the light receiving circuit 30 of the Nth optical path operate in synchronization with the operation of the corresponding light emitting circuits 22. This allows the light beams emitted one after another from the light emitting unit 13 to be received at the corresponding light receiving elements 16.

The light receiving control circuit 31 also preferably includes a light receiving data register 33, one or more floating blanking area registers 34, and a determination circuit 35. The light receiving data register 33 temporarily stores the light receiving data. The floating blanking area register 34 stores information concerning a muting area as will be described later. The determination circuit 35 determines whether any one of optical paths in a detection area other than the floating blanking area is in a light blocked state based on light incidence/light block information in the detection area outside the floating blanking area (when the floating blanking operation is performed). The determination circuit 35 also determines whether any one of the optical paths is in a light blocked state based on the light incidence/light block information in all of the detection area of the light curtain when only normal operation of the safety apparatus 10 is performed.

Referring to FIG. 5, the controller 20 comprises a communication circuit 40 for conducting communications between the light emitting unit 13, the light receiving unit 14 and a control circuit 41.

Figure 6:
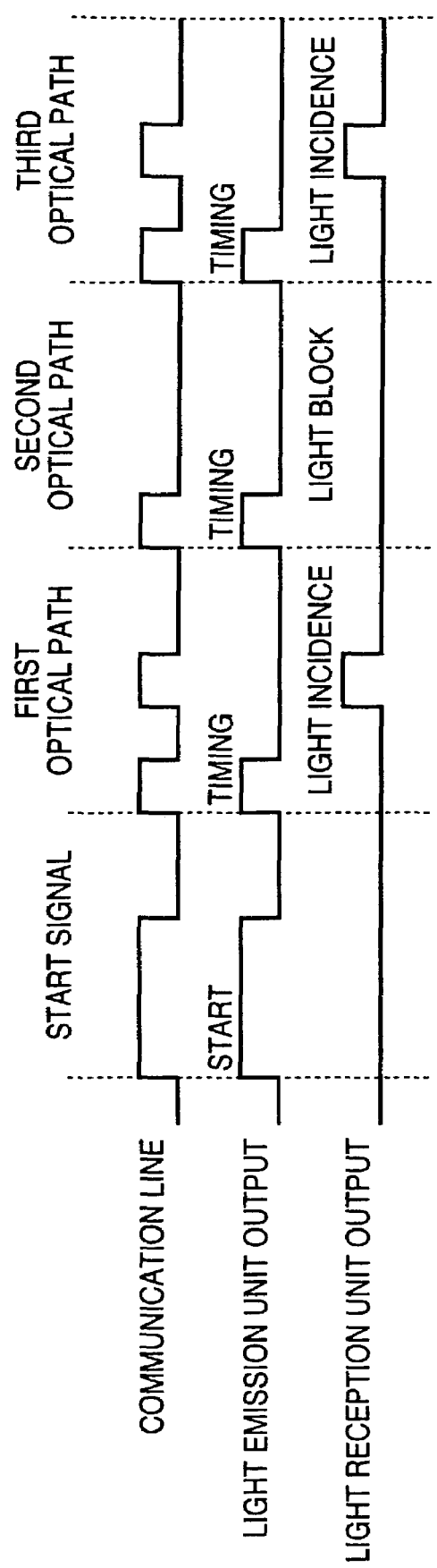
FIG. 6 is a chart describing the contents of signals passing through a communication line or a signal line for connecting the light emitting unit, the light receiving unit, and the controller that are included in the multi-optical-path photoelectric safety apparatus according to an embodiment of the present invention.

The light emitting unit 13, the light receiving unit 14, and the controller 20 are connected by the communication line or the signal line L. This line L allows not only communications, but also transfer of the light incidence/light block information (FIG. 6) between the controller 20, the light emitting unit 13 and the light receiving unit 14. As seen in FIG. 6, a signal on the communication line or the signal line L is provided by combining the timing signal output from the light emitting unit 13 and the light incidence/light block information signal output from the light receiving unit 14.

The control circuit 41 of the controller 20 preferably comprises the state display monitor or user interface display section 21. The control circuit 41 also comprises an output circuit 42 for turning an output signal on and off for an operation stop signal, etc., to the pressing machine 11 based on information from the determination circuit 35 of the light receiving unit 14.

The control circuit 41 of the controller 20 further comprises a floating blanking determination circuit 43. As the user controls an interface, the floating blanking determination circuit 43 supplies information to the light receiving unit 14 indicating which area of the light curtain, floating blanking is to be performed, and which area of the light curtain, the usual protection operation is to be performed. The user interface of the floating blanking determination circuit 43 can be input through a switch. This allows direct input of a floating blanking area through a numeric keypad or a teaching input and an external machine such as a personal computer, or the like can also be used to enter the specifications of the floating blanking area. The user can use the user interface to set a floating blanking area as desired.

Figure 7:
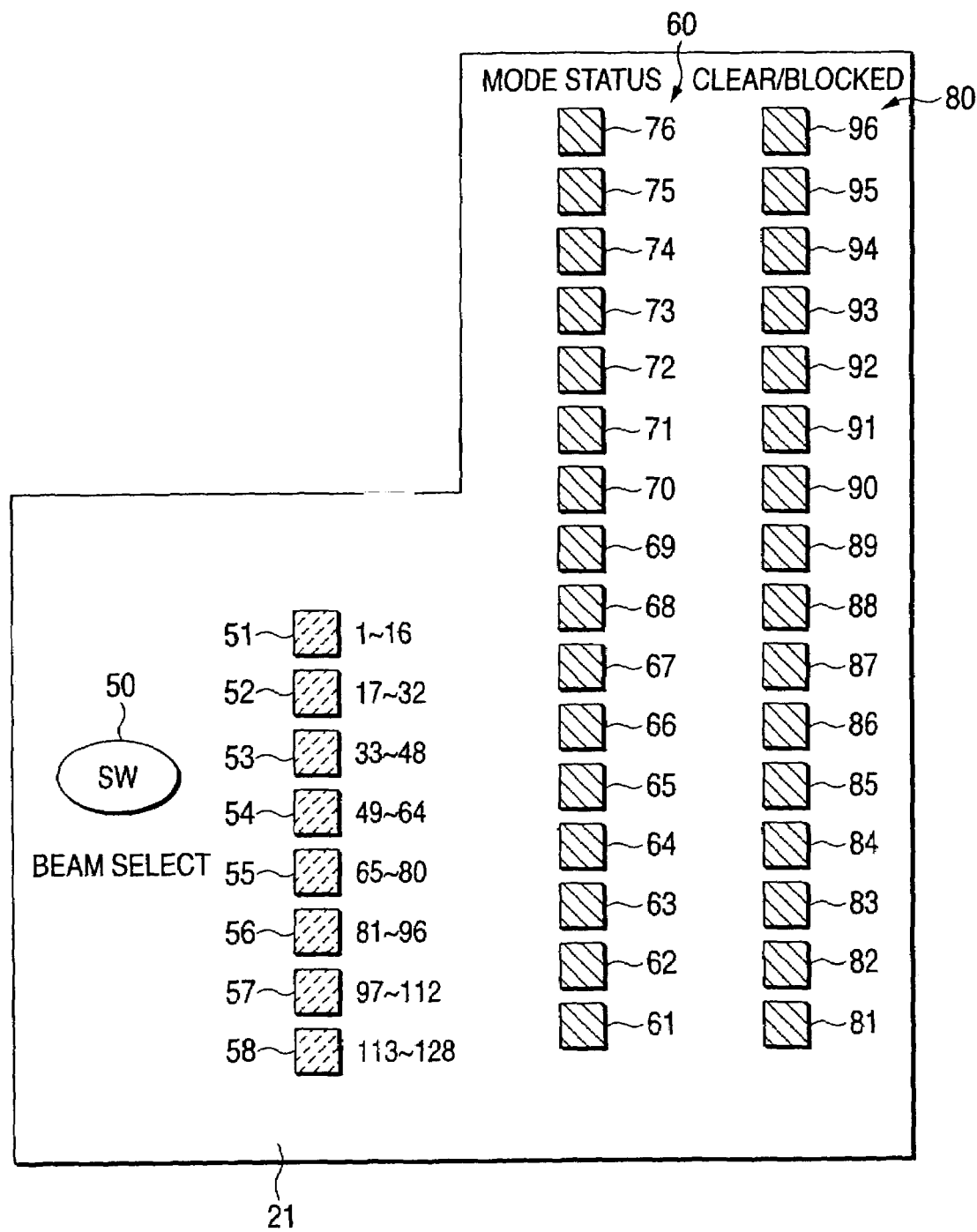
FIG. 7 is a drawing describing an outline of a display section installed in the controller.
Figure 8:
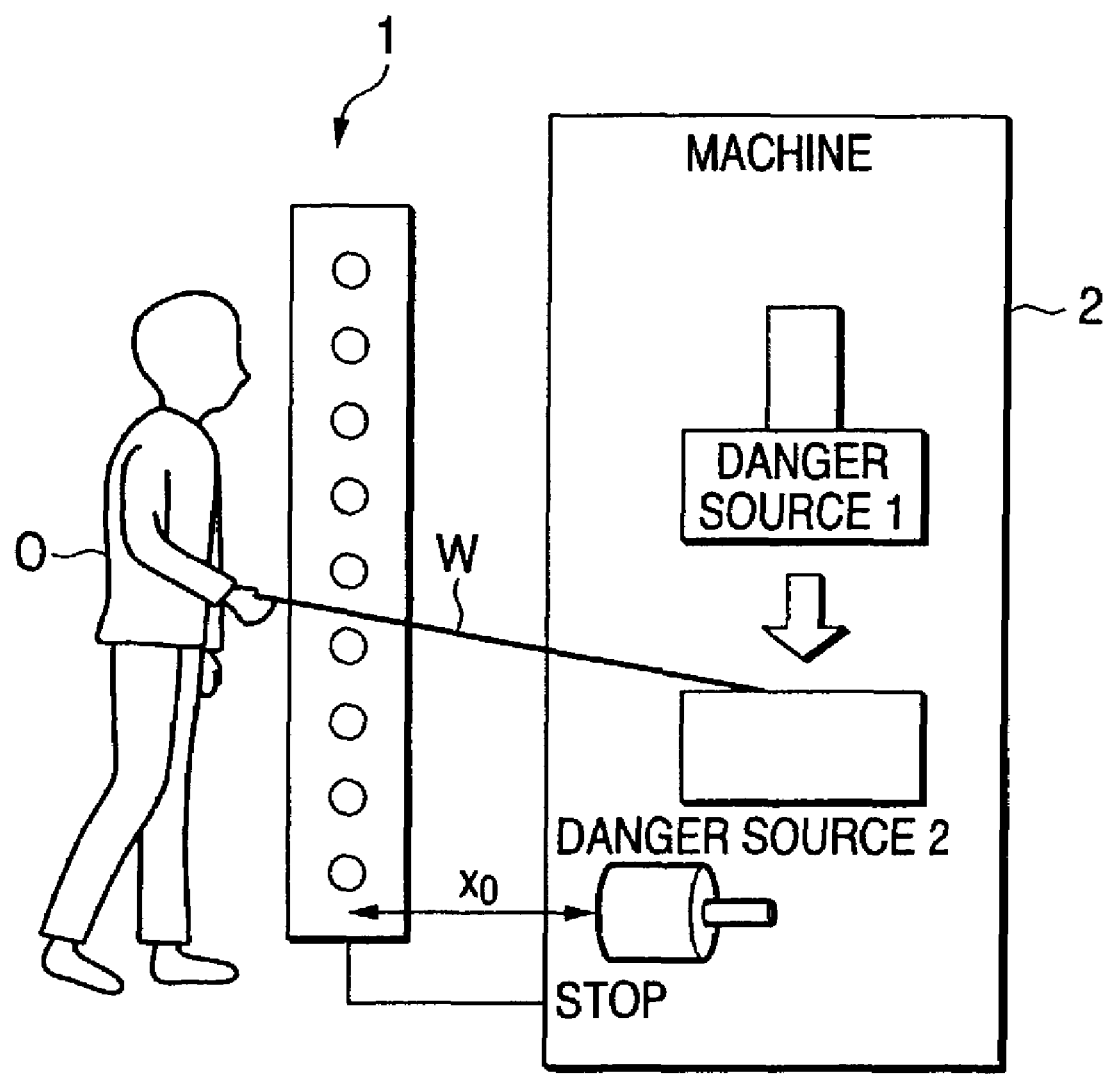
FIG. 8 is a drawing describing a floating blanking function of a multi-optical-path photoelectric safety apparatus in a related art device.

FIG. 7 shows an example of the state display monitor or user interface display section 21. The display section 21 comprises an optical path area selection switch 50 and has a plurality of LED indicator lamps 61 to 68 that are slightly spaced apart and placed in a row in the longitudinal direction to the right of the selection switch 50.

The display section 21 also has a mode state indicator lamp group 60 made up of a plurality of LEDs. The mode state indicator lamp group 60 is not limited to a particular number of lamps. In the embodiment shown, the mode state indicator lamp group 60 is preferably made up of 16 LED indicator lamps 61 to 76 as the basic unit having 16 optical paths. These lamps are slightly spaced apart and are placed with in a row in the longitudinal direction.

The display section 21 also has a light incidence/light block state indicator lamp group 80 made up of a plurality of LEDs. The light incidence/light block state indicator lamp group 80 is not limited to a particular number of lamps. In the embodiment shown, the light incidence/light block state indicator lamp group 80 is preferably made up of 16 LED indicator lamps 81 to 96 as the basic unit having 16 optical paths. These lamps are also slightly spaced apart and are placed in a row in the longitudinal direction.

Since the light incidence/light block information is always supplied from the light receiving unit 14 to the controller 20 over the communication line or the signal line L during the operation of the controller 20, the display section 21 of the controller 20 is updated in real time.

The optical path area selection switch 50 assumes that the light emitting unit 13 and the light receiving unit 14 comprise a maximum of 128 optical paths. Also, the optical path area selection switch 50 provides a selection means for allowing the user to select the optical path area to be displayed on the display section 21 so as to display, in 16 optical-path units, information concerning all of the optical paths on the mode state indicator lamp group 60 and the light incidence/light block state indicator lamp group 80. When the light emitting unit 13 and the light receiving unit 14 comprise 64 optical paths and the user operates the optical path area selection switch 50 to select the first block (consisting of the first optical path to the sixteenth optical path), the mode state and the light incidence/light block state of each of these paths are displayed on the mode state indicator lamp group 60 and the light incidence/light block state indicator lamp group 80.

Next, if the user presses the optical path area selection switch 50 again and selects the second block (consisting of the seventeenth optical path to the thirty-second optical path), the mode state and the light incidence/light block state of each of these paths are displayed on the mode state indicator lamp group 60 and the light incidence/light block state indicator lamp group 80. If the user presses the optical path area selection switch 50 again and selects the third block (consisting of the thirty-third optical path to the forty-eighth optical path), the mode state and the light incidence/light block state of each of these paths are displayed on the mode state indicator lamp group 60 and the light incidence/light block state indicator lamp group 80.

If the user again presses the optical path area selection switch 50 and selects the fourth block (consisting of the forty-ninth optical path to the sixty-fourth optical path), the mode state and the light incidence/light block state of each of these paths are displayed on the mode state indicator lamp group 60 and the light incidence/light block state indicator lamp group 80.

It is preferred that the basic unit uses eight indicator lamps 51-58, each lamp being for 16 optical paths. The lamps are disposed to the right of the switch 50 and indicate the current optical path area selected from among the eight blocks to show the first optical path to the 128th optical path. The indicator lamps 51-58 are arranged in a row in the longitudinal direction and are assigned from top to bottom as follows: The indicator lamp 51 to the first to sixteenth optical paths; the indicator lamp 52 to the seventeenth to thirty-second optical paths; the indicator lamp 53 to the thirty-third to forty-eighth optical paths; the indicator lamp 54 to the forty-ninth to sixty-fourth optical paths; the indicator lamp 55 to the sixty-fifth to eightieth optical paths; the indicator lamp 56 to the eighty-first to ninety-sixth optical paths; the indicator lamp 57 to the ninety-seventh to 112th optical paths; and the indicator lamp 58 to the 113th to 128th optical paths. To display these assignments, an identification sign or numeral (1-16, 17-32, . . . , 113-128) is preferably added to the right or top or bottom of each of the indicator lamps 51-58.

The optical path area indicator lamps 51-58 may also be assigned to the optical paths as desired. For example, they may be assigned in an order from bottom to top starting with the first to sixteenth optical paths, the seventeenth to thirty-second optical paths, . . . , the 113th to 128th optical paths. When the indicator lamps contained in the indicator lamp groups 60 and 80 are placed side by side, the optical path area indicator lamps 61-68 may be assigned in an order from right to left starting with the first to sixteenth optical paths, the seventeenth to thirty-second optical paths, . . . , the 113th to 128th optical paths or they may be assigned in order from left to right starting with the first to sixteenth optical paths, the seventeenth to thirty-second optical paths, . . . , the 113th to 128th optical paths.

When the floating blanking area is set, the indicator lamps of the mode state indicator lamp group 60 that correspond to the optical paths where floating blanking is set, are turned on. Accordingly, the user can visually check whether or not the floating blanking area is set for each optical path.

The floating blanking function of the multi-optical-path photoelectric safety apparatus 10 does not forcibly stop the operation of the pressing machine or the folding machine 11 until a plurality of optical paths which are adjacent to each other are blocked. Typically, when two contiguous optical paths are blocked, an off signal is output from the output circuit 42 of the controller 20 to the pressing machine or the folding machine 11 to stop the operation of the machine 11.

The floating blanking function can be set for any area selected by the user in the detection area of the light curtain that is formed between the light emitting unit 13 and the light receiving unit 14. Of course, the entire detection area between the light emitting unit 13 and the light receiving unit 14 can also be set as the floating blanking area.

In the setup of the floating blanking area, if one of the optical paths belonging to the area is blocked, it is ignored. If two contiguous optical paths are blocked, the off signal for forcibly stopping the operation of the pressing machine or the folding machine 11 is generated, and this off signal is supplied to the machine 11.

On the other hand, the usual protection function of the multi-optical-path photoelectric safety apparatus 10 serves in any area other than the floating blanking area. Thus, when light is blocked, the off signal for stopping the operation of the pressing machine or the folding machine 11 is immediately supplied to the pressing machine or the folding machine 11.

When the user enters a floating blanking area in the controller 20, for example, by a teaching method or through the numeric keypad, the controller 20 temporarily stores the entered floating blanking area information in the floating blanking area register 34 of the light receiving unit 14 via the communication line or signal line L.

The light receiving unit 14 then determines in the determination circuit 35 whether or not two contiguous optical paths of the optical paths stored in the floating blanking area register 34, are in a light blocked state. The light receiving unit 14 also determines in the determination circuit 35 whether or not any one of the optical paths belonging to any area other than the floating blanking area is in a light blocked state. If two contiguous optical paths are in a light blocked state in the floating blanking area or if any one of the optical paths is in a light blocked state in the normal operation area, the light receiving unit 14 determines that the light block substance is not a workpiece but rather a part of a human being that has entered the light curtain. The light receiving unit 14 then sends a light block signal to the controller 20. The controller 20 turns an output signal on and off based on the information from the determination circuit 35 of the light receiving unit 14. Upon receiving the light block signal from the light receiving unit 14, the controller 20 outputs the off signal to the pressing machine or the folding machine 11 to forcibly stop the operation of the machine 11.

Referring to FIG. 1, if the B-portion of the light curtain is set as a floating blanking area, the operation of the pressing machine or the folding machine 11 is forcibly stopped when two contiguous optical paths are blocked in the floating blanking area B. On the other hand, the normal protection function operates in areas A and C between which the B portion is sandwiched. In these areas A and C, if any one of the optical paths enters a light blocked state, the operation of the pressing machine or the folding machine 11 is immediately stopped.

If the size of the minimum detection body in the areas A and C where normal protection operates is, for example, 25 mm in diameter, the size of the minimum detection body in the area B of the floating blanking area becomes 45 mm in diameter. If the response time of the light curtain and the stop response time of the pressing machine or the folding machine 11 are 35 ms in total, the safety distance x2 (between the danger source 2 and the multi-optical photoelectric safety apparatus 10) based on European Standard EN999 is 158 mm in areas A or C and the safety distance x1 (between the danger source 1 and the multi-optical photoelectric safety apparatus 10) in area B becomes 906 mm.

Therefore, in the floating blanking area B, the safety distance x1 of 906 mm needs to be maintained between the first danger source and the multi-optical photoelectric safety apparatus 10. In the normal operation area C, the safety distance x2 of 158 mm may be maintained away from the second danger source, such as the drive source of press operation. Thus, the distance between the second danger source and the light curtain can be shortened when compared to the related art device which sets the entire detection area for the light curtain as the floating blanking area.

Thus, in many application examples, the light curtain can be brought closer to the pressing machine or the folding machine 11 when compared with the related art devices. When the worker inserts a workpiece W into a working machine such as the pressing machine or the folding machine 11, the distance the workpiece W must be moved can be shortened and thus productivity can be increased.

To set the floating blanking area, a plurality of floating blanking areas may be set as required and the floating blanking area may be switched, for example, from a first floating blanking area to a second floating blanking area based on an external signal input to the input circuit 44 of the controller 20.

One specific application example includes working on a plurality of workpieces with one metal working machine. In this case the workpiece range of movement can change depending on the metal mold attached to the metal working machine. In such a case, it is advantageous to provide a plurality of floating blanking areas and to change the floating blanking area when a mold is changed.

Specifically, the light receiving unit 14 may be provided with a plurality of floating blanking area registers 34. Different floating blanking areas may be stored in the floating blanking area registers 34 with a one-to-one correspondence. The floating blanking area may also be changed to the floating blanking area that corresponds to the metal mold to be used.

To set a plurality of floating blanking areas, an input operation using the user interface of the floating blanking determination circuit 43 of the controller 20 may be repeatedly performed, as described above.

For example, when metal mold A is used, an input signal A is input to the input circuit 44 of the controller 20 for operating the first floating blanking area. Further, when metal mold B is used, an input signal B is input to the controller 20 for causing the light receiving unit 14 to select the second floating blanking area, whereby the second floating blanking area corresponding to the metal mold B can be operated. This allows the device to skip the process of setting the floating blanking area when each mold is changed.

Each floating blanking area can be set by a teaching method. As one teaching method, a light block substance can be placed in the area that is to be set as a floating blanking area and in the light blocked state, the operator presses a teaching button (not shown) for specifying the floating blanking area. Then information concerning the floating blanking area is input to the controller 20. During the teaching method, each area where no light block substance exists in the detection area of the light curtain is specified as the normal operation area.

In another teaching method, the area where the light is blocked when the operator presses the teaching button again after previously pressing the teaching button may be input to the controller 20 as the area to be set as the floating blanking area. This is in contrast to pressing the teaching button after placing the area to be set as the floating blanking area in a light blocked state.

Although the invention has been described in its preferred embodiment, it is to be understood that the invention is not limited to the described embodiments and can be changed within the scope set forth in the accompanying claims.

For example, in the above-described invention, blocking two adjacent optical paths is adopted as the light blocked condition for exerting the floating blanking function and forcibly stopping the operation of the pressing machine 11, etc. However, when two or more alternate optical paths in the floating blanking area are blocked, the floating blanking determination circuit 43 may determine that the light blocked condition has occurred. Alternatively, the user may specify a plurality of optical paths in the floating blanking area and when these specified optical paths are blocked, the floating blanking determination circuit 43 may determine that the light blocked condition has occurred.

The user may also choose either of the following: The floating blanking determination circuit 43 determines that the light blocked condition has occurred when two contiguous optical paths or a predetermined number of optical paths greater than two are blocked; and the floating blanking determination circuit 43 determines that the light blocked condition has occurred when two alternate optical paths or two discontiguous optical paths or a predetermined number of discontiguous optical paths greater than two in the floating blanking area are blocked.

Preferably, the user can set the desired number of optical paths to be blocked when determining that the light blocked condition has occurred. The user may also be able to select a plurality of any of the optical paths in the floating blanking area and set the desired optical paths to be blocked when determining that the light blocked condition has occurred.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

The text of Japanese priority application no. 2002-057378 filed Mar. 4, 2002 is hereby incorporated by reference.

What is claimed is:

1. A multi-optical-path photoelectric safety apparatus comprising:
   a light emitting unit, the light emitting unit having a plurality of light emitting elements disposed at equal intervals in a longitudinal direction of the light emitting unit;
   a light receiving unit forming a plurality of optical paths with the light emitting unit so as to provide a single light curtain formed along a single plane passing through the light emitting unit and the light receiving unit, the light receiving unit having a plurality of light receiving elements disposed at equal intervals in a longitudinal direction of the light receiving unit, wherein the light curtain in the single plane includes a protection area including a floating blanking area and a non-floating blanking area; and
   a controller for controlling the light emitting unit and the light receiving unit,
   wherein the controller includes a normal light curtain setting means for setting a normal light curtain function in all of the protection area for forcibly stopping operation of an apparatus protected by the light curtain when at least one of the optical paths forming the light curtain enters a light blocked state,
   wherein the controller also includes an area selecting means for selecting a part of all the protection area protected by the normal light curtain function as a floating blanking area such that a number of contiguous optical paths of the part of the protection area is less than the number of contiguous optical paths forming the single light curtain, any remaining area other than the floating blanking area in all of the protection area being the non-floating blanking area where the normal light curtain function is operated,
   wherein the controller also includes a floating blanking function setting means for setting a floating blanking function in the floating blanking area,
   wherein the controller also includes an optical paths number setting means for setting the number of the optical paths which is smaller than the number of optical paths of the floating blanking area, and
   wherein the floating blanking function forcibly stops operation of the apparatus protected by the light curtain when the number of optical paths of the floating blanking area which enter a light blocked state is larger than the set number of optical paths set in the optical paths number setting means and allows the apparatus protected by the light curtain to continuously operate when the number of optical paths which enter a light block state is equal to or smaller than the set number of optical paths set in the optical paths number setting means; and
   an optical path area selection switch which divides all of the optical paths into plural basic block units, each of the basic block units being composed of a predetermined number of optical paths, wherein the optical path area selection switch selects one of the basic block units; and
   a display unit by which a user can check whether or not the floating blanking area is set for each of the optical paths of the selected basic block unit.

2. The multi-optical-path photoelectric safety apparatus as claimed in claim 1, wherein the area selecting means is an external input means.

3. The multi-optical-path photoelectric safety apparatus as claimed in claim 1, wherein the area selecting means is a teaching device.

4. The multi-optical-path photoelectric safety apparatus as claimed in claim 1, wherein the area selecting means sets a plurality of different floating blanking areas, the floating blanking function setting means sets the floating blanking function for the plurality of different floating blanking areas, and wherein the area selecting means can switch among the plurality of different floating blanking areas.

5. The multi-optical-path photoelectric safety apparatus according to claim 1, further comprising:
a storing section for storing information including a plurality of different floating blocking areas where the floating blocking function can be exerted; and
a floating blocking area switch unit for switching the floating blocking area among the plurality of different floating blocking areas in the storing section.

6. The multi-optical-path photoelectric safety apparatus as claimed in claim 1, wherein the optical paths number setting means sets the number of the optical paths to be two, and the floating blanking function setting means sets a floating blanking function for forcibly stopping operation of the apparatus protected by the light curtain when at least two continuous optical paths forming the light curtain enter a light blocked state.

7. The multi-optical-path photoelectric safety apparatus as claimed in claim 6, wherein the controller selects at least one of a function which forcibly stops operation of the apparatus protected by the light curtain when at least two optical paths forming the light curtain enter a light blocked state and a function which forcibly stops operation of the apparatus protected by the light curtain when at least two continuous optical paths forming the light curtain enter a light blocked state.

8. The multi-optical-path photoelectric safety apparatus as claimed in claim 1, wherein the display unit allows the user to check a light incidence/light block state.

9. A multi-optical-path photoelectric safety apparatus comprising:
a light emitting unit having a plurality of light emitting elements equally spaced from each other and being disposed in a row in a longitudinal direction of the light emitting unit;
a light receiving unit separated from the light emitting unit and having a corresponding number of light receiving elements as the number of the light emitting elements, the light receiving elements being equally spaced from each other and being disposed in a row in a longitudinal direction of the light receiving unit, wherein each of the light receiving elements with the corresponding light emitting element form optical paths for forming a single light curtain along a single plane, and wherein the light curtain in the single plane includes a protection area including a floating blanking area and a nonfloating blanking area; and
a controller for controlling the light emitting unit and the light receiving unit,
wherein the controller includes a normal light curtain setting means for setting a normal light curtain function in all of the protection area for forcibly stopping operation of an apparatus protected by the light curtain when at least one of the optical paths forming the light curtain enters a light blocked state,
wherein the controller also includes a floating blanking area setting means for setting a part of all the protection area protected by the normal light curtain function as a floating blanking area where a floating blanking function can be operated such that a number of contiguous optical paths of the part of the protection area is less than the number of contiguous optical paths forming the single curtain, any remaining area other than. the floating blanking area in all the protection area being the nonfloating blanking area where the normal light curtain function is operated,
wherein the controller also includes an optical paths number setting means for setting the number of the optical paths which is smaller than the number of optical paths of the floating blanking area, and
wherein the floating blanking function is a function that will stop operation of an apparatus protected by the light curtain when the number of optical paths of the floating blanking area which enter a light blocked state is larger than the set number of optical paths set in the optical paths number setting means,
and that will continuously operate when the number of optical paths which enter a light blocked state is equal to or smaller than the set number of optical paths set in the optical paths number setting means; and
an optical path area selection switch which divides all of the optical paths into plural basic block units, each of the basic block units being composed of a predetermined number of optical paths, wherein the optical path area selection switch selects one of the basic block units; and
a display unit by which a user can check whether or not the floating blanking area is set for each of the optical paths of the selected basic block unit.

10. The multi-optical-path photoelectric safety apparatus according to claim 9, further comprising:
a storing section for storing information including a plurality of different floating blocking areas where the floating blocking function can be exerted, the floating blocking area setting unit setting the different floating blocking areas; and
a floating blocking area switch unit for switching the floating blocking area among the plurality of different floating blocking areas in the storing section.

11. The multi-optical-path photoelectric safety apparatus as claimed in claim 9, wherein the display unit allows the user to check a light incidence/light block state.

12. A multi-optical-path photoelectric safety apparatus comprising:
a light emitting unit having a first case and emitting a light, the light emitting unit having a plurality of light emitting elements disposed at equal intervals in a longitudinal direction of the light emitting unit;
a light receiving unit having a second case and receiving the light emitted from the light emitting unit, the light receiving unit having a plurality of light receiving elements disposed at equal intervals in a longitudinal direction of the light receiving unit the light receiving unit forming a plurality of optical paths with the light emitting unit so as to provide a single light curtain between the light emitting unit and the light receiving unit, wherein the light curtain includes a detection area between the first case and the second case; and
a controller for controlling the light emitting unit and the light receiving unit,
wherein the controller includes a floating blanking function device having a floating blanking function and setting a part of all the detection area between the first case and the second case as a floating blanking area such that a number of contiguous optical paths of the part of the detection area is less than the number of contiguous optical paths forming the single light curtain, the floating blanking area being an area where the floating blanking function is operated,
wherein the controller also includes a protection function for controlling any remaining area between the first case and the second case other than the floating blanking area, the protection function forcibly stopping operation of an apparatus protected by the light curtain when at least one of the optical paths forming the light curtain enters a light blocked state, wherein the controller also includes an optical paths number setting means for setting the number of the optical paths which is smaller than the number of optical paths of the floating blanking area, wherein the floating blanking function forcibly stops operation of an apparatus protected by the light curtain when the number of optical paths of the floating blanking area which enter a light blocked state is larger than the set number of optical paths set in the optical paths number setting means and allows the apparatus protected by the light curtain to continuously operate when the number of optical paths which enter a light blocked state is equal to or smaller than the set number of optical paths set in the optical paths number setting means, and wherein the controller also includes a display section having mode state indicators, and each mode state indicator corresponds to each optical path of the light curtain to check whether the floating blanking function is set so that the each mode state indicator is turned on when the floating blanking function is set by the floating blanking function device; and an optical path area selection switch which divides all of the optical paths into plural basic block units, each of the basic block units being composed of a predetermined number of optical paths, wherein the optical path area selection switch selects one of the basic block units; and a display unit by which a user can check whether or not the floating blanking area is set for each of the optical paths of the selected basic block unit.

13. The multi-optical-path photoelectric safety apparatus as claimed in claim 12, wherein the display unit allows the user to check a light incidence/light block state.

14. A multi-optical-path photoelectric safety apparatus comprising:

a light emitting unit emitting a light and having a first case, the light emitting unit having a plurality of light emitting elements equally spaced from each other and being disposed in a row in a longitudinal direction of the light emitting unit;

a light receiving unit having a second case, the light receiving unit receiving the light from the light emitting unit, the light receiving unit being separated from the light emitting unit and having a corresponding number of light receiving elements as the number of the light emitting elements, the light receiving elements being equally spaced from each other and being disposed in a row in a longitudinal direction of the light receiving unit, wherein each of the light receiving elements with a corresponding light emitting element form an optical path so as to collectively provide a single light curtain, wherein the light curtain includes a detection area between the first case and the second case; and a controller for controlling the light emitting unit and the light receiving unit, wherein the controller includes a floating blanking area setting unit for setting a part of the detection area between the first case and the second case as a floating blanking area, where a floating blanking function is operated such that a number of optical paths of the part of the detection area is less than the number of optical paths forming the single light curtain, wherein the controller also includes a protection function for controlling any remaining area between the first case and the second case other than the floating blanking area, the protection function forcibly stopping operation of an apparatus protected by the light curtain when at least one of the optical paths forming the light curtain enters a light blocked state, wherein the controller also includes an optical paths number setting means for setting the number of the optical paths which is smaller than the number of optical paths of the floating blanking area, wherein the floating blanking function is a function that will stop operation of an apparatus protected by the light curtain when the number of contiguous optical paths which enter a light blocked state of the floating blanking area is larger than the set number of contiguous optical paths set in the optical paths number setting means, and that will allow the apparatus continuously operate when the number of optical paths which enter a light blocked state is equal to or smaller than the set number of optical paths set in the optical paths number setting means, and wherein the controller also includes a display section having mode state indicators, and each mode state indicator corresponds to each optical path of the light curtain to check whether the floating blanking function is set so that the each mode state indicator is turned on when the floating blanking function is set by the floating blanking area setting unit; and an optical path area selection switch which divides all of the optical paths into plural basic block units, each of the basic block units being composed of a predetermined number of optical paths, wherein the optical path area selection switch selects one of the basic block units; and a display unit by which a user can check whether or not the floating blanking area is set for each of the optical paths of the selected basic block unit.

15. The multi-optical-path photoelectric safety apparatus as claimed in claim 14, wherein the display unit allows the user to check a light incidence/light block state.

16. A multi-optical-path. photoelectric safety apparatus comprising:

a light emitting unit emitting a light and having a first case, the light emitting unit having light emitting elements equally spaced from each other and being disposed in a row in a longitudinal direction of the light emitting unit;

a light receiving unit having a second case, the light receiving unit receiving the light from the light emitting unit, the light receiving unit being separated from the light emitting unit and having a corresponding number of light receiving elements as the number of the light emitting elements, the light receiving elements being equally spaced from each other and being disposed in a row in a longitudinal direction of the light receiving unit, wherein each of the light receiving elements with a corresponding light emitting element form an optical path so as to collectively provide a single light curtain along a single plane, wherein the light curtain in the single plane includes a detection area between the first case and the second case; and a controller for controlling the light emitting unit and the light receiving unit, wherein the control includes an area selecting means for selecting a part of all the detection area as a floating blanking area such that a number of contiguous optical paths of the part of the detection area is less than the number of contiguous optical paths forming the single light curtain, wherein the controller also includes a floating blanking function setting device for setting a first mode of a floating blanking function wherein the floating blanking function is set in each optical path of all of the light curtain, and a second mode of the floating blanking function wherein the floating blanking function is set in each optical path of the floating blanking area, wherein the controller also includes an optical paths number setting means for setting the number of the optical paths which is smaller than the number of optical paths of the floating blanking area, wherein the floating blanking function will stop operation of an apparatus protected by the light curtain when the number of contiguous optical paths of the floating blanking area which enter a light blocked state is larger than the set number of contiguous optical paths set in the optical paths number setting means, and will allow the apparatus to continuously operate when the number of optical paths which enter a light blocked state is equal to or smaller than the set number of optical paths..set in the optical paths number setting means, and wherein the controller also includes a display section having mode state indicators, and each mode state indicator corresponds to each optical path of the light curtain to check whether the floating blanking function is set so that the each mode state indicator is turned on when the floating blanking function is set by the floating blanking function setting device; and an optical path area selection switch which divides all of the optical paths into plural basic block units, each of the basic block units being composed of a predetermined number of optical paths, wherein the optical path area selection switch selects one of the basic block units; and a display unit by which a user can check whether or not the floating blanking area is set for each of the optical paths of the selected basic block unit.

17. The multi-optical-path photoelectric safety apparatus as claimed in claim 16, wherein the display unit allows the user to check a light incidence/light block state.

* * * * *